United States Patent [19]

Capossela, Jr. et al.

[11] 3,881,028

[45] Apr. 29, 1975

[54] PARTIALLY GELATINIZING POTATO PIECES BY A MICROWAVE HEAT TREATMENT PRIOR TO DEEP FAT FRYING

[75] Inventors: Anthony C. Capossela, Jr., Tarrytown, N.Y.; John F. Halligan, Greenwich, Conn.; Leslie S. Makaron, Munsey, N.Y.

[73] Assignee: General Foods Corporation, White Plains, N.Y.

[22] Filed: Dec. 18, 1970

[21] Appl. No.: 99,681

[52] U.S. Cl. .............. 426/242; 426/243; 426/377; 426/438; 426/441; 426/455; 426/456; 426/464; 426/465; 426/473
[51] Int. Cl. ........................... A23l 1/12; A23b 7/03
[58] Field of Search ............ 99/100, 103, 104, 207, 99/221; 219/10.55; 426/242, 243, 438–441, 455, 456, 464, 465, 473

[56] References Cited
UNITED STATES PATENTS

| 2,611,705 | 9/1952 | Hendel | 99/100 P |
|---|---|---|---|
| 2,797,166 | 6/1957 | Siciliano | 99/100 P |
| 2,973,276 | 2/1961 | Cys | 99/207 |
| 3,044,880 | 7/1962 | Brgyo | 99/100 P |
| 3,353,962 | 11/1967 | Smith | 99/100 P |
| 3,365,301 | 1/1968 | Lipoma | 99/100 P |
| 3,518,097 | 6/1970 | Menzi | 99/207 |
| 3,578,463 | 5/1971 | Smith | 99/103 |

FOREIGN PATENTS OR APPLICATIONS

| 1,034,035 | 6/1966 | United Kingdom | 99/207 |

OTHER PUBLICATIONS

Potato Processing, Talburt and Smith (2nd ed.) Oui Publishing Co., Westport, Conn. 1967.

*Primary Examiner*—Norman Yudkoff
*Assistant Examiner*—Martin G. Mullen
*Attorney, Agent, or Firm*—Bruno P. Struzzi; Thomas V. Sullivan; Thaddius J. Carvis

[57] ABSTRACT

Rehydratable deep-fat fried potato pieces are produced by first partially gelatinizing the starch in pieces of potato without effecting a moisture loss therefrom of greater than 3% by a microwave heat treatment prior to deep fat frying and heating said pieces to effect a dehydration thereof. The treated pieces are shelf stable without refrigeration and are rehydrated by soaking in water.

11 Claims, No Drawings

PARTIALLY GELATINIZING POTATO PIECES BY A MICROWAVE HEAT TREATMENT PRIOR TO DEEP FAT FRYING

BACKGROUND OF THE INVENTION

The present invention relates to the preparation of potatoes, and more specifically, the preparation of french fried potatoes that may be stored on the shelf for extensive time periods without the need for refrigeration.

It is well known in the prior art that potatoes may be dehydrated, but extensive problems have resulted in producing a final product that has high quality from consumer considerations. Flavor loss from the processing steps has caused lower quality than is desired. Additionally, storage of the dehydrated product may necessitate specific conditions such as refrigeration, including freezing. Upon rehydration, non-uniform water absorption in the product may result which also lowers product quality.

Adler et al, U.S. Pat. No. 3,338,724 patented Aug. 29, 1967 discloses a process for preparing a dehydrated, puffed potato by immersion of small potato pieces in a sodium chloride water solution at elevated temperature for extended time periods. The potato pieces are dried to a mixture content less than 10% in a stream of air heated to a temperature of between 310° to 390°F.

Katucki et al, U.S. Pat. No. 3,359,123 patented Dec. 19, 1967 teaches partially cooking raw potatoes in an atmosphere with a relative humidity less than 100% which avoids moisture pick-up by the potato resulting in desirable gelatinization of starch cells without cell rupture. The potato that is partially gelatinized is subjected to a freezing step followed by drying the potato to a moisture content of less than about 10% by weight. This potato mixture may be rehydrated in water and, if desired, may be french fried in a hot vegetable oil.

Lipoma et al, U.S. Pat. No. 3,365,301 patented Jan. 23, 1968 is directed to a snack-type chip which utilizes the microwave technique to heat potato slices separately from cooking and heating in fat or oil. The patentee discloses a maximum potato thickness of 0.075 inches as a starting material which is deep-fat fried in an oil followed by the microwave heating. The microwave heating causes product crispness without a substantial change in color. The reference discloses the suitability of microwave heating both before and after frying, although the examples disclose the microwave heating after deep-fat frying.

SUMMARY OF THE INVENTION

This invention permits the formation of a french fried potato product that is dehydrated and may be stored on the shelf without a need for refrigeration. The product does not need any special wrapping materials, although a moisture-impermeable container is desired for extensive storage times to prevent water absorption from the atmosphere. When the product is to be used by the consumer, it is soaked in water to cause rehydration and warmed to heating temperature in an oven.

Prior art rehydration products suffer from the disadvantage in that cell wall structure may be partially destroyed during processing so as to cause serious problems upon rehydration. Additionally, during processing in the prior art, rupturing from swelling of cell walls during gelatinization occurs which also leads to a loss in product quality. In a rehydrated product, the cell structure should be of such nature that water penetration of the outer surface and through the cell wall structure does not damage the product yet, at the same time, the cell structure readily permits rehydration. Difficulty has been encountered in the prior art in meeting these parameters.

In the technique of this disclosure, the starting whole potatoes are preferably peeled and cut to shape and extremely thin pieces are avoided since, at frying, total penetration of the oil is not desirable and would change the product into a potato chip.

The cut potatoes are preferably blanched which comprises heat treatment either by water or steam. The heat treatment is sufficient only to blanch the potato without extensive cooking and gelatinization. The purpose of the blanching is to inactivate the enzyme content of the potato.

After blanching, an optional step is a soaking of the potato in a salt solution such as sodium chloride. This soaking is not of absolute necessity, although it has been discovered that a higher quality product results if this soak is included.

A critical procedure in this invention is subjecting the potato pieces to microwave heating for a period of time. Although minimal moisture reduction generally takes place during the heating, this step is not considered to be essentially for dehydration. The maximum moisture reduction from the microwave processing will be of the order of about 2.5 to 3.0%. After the microwave heating, the potato pieces are fried in a fat or oil, which step is a conventional and necessary technique in the art for french fried potatoes. After deep-fat frying, which causes penetration of the fat or oil through the outside as well as some inner layers of the potato without total penetration throughout the pieces, the potato pieces are dried to remove additional moisture. A suitable drying technique is by microwave heating, although generally conventional heating techniques are satisfactory.

The formed dehydrated product now has the capability of being stable for extensive time periods without the deterioration of the product. Since a moist atmosphere will cause surface absorption of water, the product is preferably stored in a moisture-impermeable material such as a pouch or can. In such a container, the product need not be refrigerated. For consumption as a french fried potato, the product is removed from the container and rehydrated in water. The product is then heated in an oven at elevated temperature to produce a similar french fried potato product that has not undergone dehydration and extensive storage times.

It is the purpose of the present invention to produce a rehydratable french fried potato.

It is the purpose of the present invention to produce a shelf-stable, french fried potato that does not need refrigeration for storage.

DETAILED DESCRIPTION OF THE INVENTION

As employed herein, a french fried potato refers to a potato which is fried in a heated fat or oil which partially penetrates the potato. Initially, in the procedure for forming a rehydrated french fried potato, the potato is cut to size. There is no maximum upper limit to the potato pieces since, for example, unduly large pieces will mean that the outer surface of the potato at the frying stage only will be penetrated by the oil, and the bulk of the potato will possess a mealy and soft texture. The thinness of the potato pieces is dictated by the fact that if total oil penetration during the frying step occurs, a french fried potato will not be obtained but rather a snack item, a potato chip. It is the purpose in the present invention to produce only french fried potatoes having a center which is not penetrated by oil and excludes potato products that have total oil penetration of the entire potato mass.

The potato pieces are preferably blanched, since it is desirable to inactivate the natural enzyme content. Blanching procedures in the prior art are well known and can include both hot water as well as steamed blanching. Hot water blanching is less desirable, since more leaching of the solids from the potato takes place.

It has been found that superior results take place if the blanched potato pieces are soaked in a heated salt solution such as sodium chloride, although a final dehydrated potato product is produced that is satisfactory without this step. The reason the salt dip produces a superior final product is that the salt apparently removes starch from the outside surface cells and realigns the starch granules immediately below the surface. Blanching of the product inherently causes some surface gelatinization, and it is thought that the salt dip removes some of the starch from the surface cells reducing the non-uniformity in the potato piece. The final effect that is noticed in the product is that a crispier shell is obtained after drying of the french fry, rehydrating and warming.

Prior to deep-fat frying, a necessary and critical step in the present procedure is the employment of microwave heating which may cause some water loss from the potato. Water loss is considered to be minimal and, therefore, microwave heating is not considered a primary dehydration procedure. The total water loss from the microwave heating step will be limited to a maximum of about 2.5 to 3.0%. Excessive water losses would require longer heating times than is practical in this invention. The result apparently obtained from the microwave heating is that a degree of gelatinization occurs throughout the total potato piece. Microwaves produce the result of uniform heating of the entire product as opposed to conventional heating wherein temperature gradients from the outer to the inner surface occur. However, excessive microwave heating as evidenced by moisture reductions of over about 3% by weight is considered to result in excessive gelatinization of the starch in the product. The final product with excessive microwave heating is unduly hard and dry and does not resemble an acceptable product. Minimum microwave heating time will cause the apparent effect of some gelatinization. Acceptable results will be obtained, although optimum quality will not result.

After the microwave heating step, the potato pieces are deep-fat fried as in a vegetable oil. This step of cooking the potato pieces in an oil or fat is a conventional technique in the art. Thus, the term deep-fat frying is utilized to denote the process of frying the potato. The fat or oil will not penetrate the entire potato piece and, therefore, a minimum potato thickness of ¼ inch is used. The frying temperature may be in a range of about 325° to 375°F, although the temperatures between 300° to 400°F are satisfactory. The deep-fat frying step is also a dehydration step, since there is extensive moisture loss from the entire potato. For example, moisture losses of about 50 to 55% have been found to occur from the deep-fat frying step. The frying time of the potatoes have been found to be longer than conventional within a range of 4 to 12 minutes. The governing factor in the deep-fat frying step is that excessive heat and frying times are avoided since burning of the product will result.

After the deep-fat frying, the potato is heated to remove additional excess moisture not removed from the previous step. Conventional drying procedures are satisfactory, and an optimum product from consumer considerations can be realized by common techniques employing conduction, convection and/or radiation. Moisture reductions from the latter heating stage have been found to range from about 10 to 20%, although the exact range is not critical. Unlike the first heating stage using microwaves, the heating staging following deep-fat frying is primarily considered to be a drying step.

The formed product may not be stored for extensive time periods without product degredation and the need for refrigeration. Since the french fried potato is in a dehydrated stage, it can absorb atmospheric moisture, and the product is desirably packaged in a moisture-impermeable container. Although the product has pleasant taste characteristic in its dehydration stage, its primary purpose is as a normal french fried potato served in a heated condition. For usage in this stage, the french fried potato must be rehydrated with water. While cold tap water is acceptable, faster rehydration times occur when warm tap water is employed. The french fried potato is soaked for a period of about 5 to 10 minutes to cause rehydration of the product. The material is then heated in an oven to a warming temperature to product a french fried product of superior taste quality.

To illustrate the innovative aspects of the present invention, the following examples are provided:

EXAMPLE 1

A Sebago potato is peeled, cut into a rectangular shape of dimensions ¼ inch × ¼ inch × 2½ inches, washed in cold water, and blanched for a 1-minute time period at 212°F. The blanched product is quenched in cold water and soaked in a 1.5% sodium chloride solution at 180°F and again washed with cold water. The potato pieces are placed in a Ratheon Institutional microwave oven for approximately 45 seconds and then fried in a hydrogenated, coconut oil at 350°F for about 6 minutes. The product was then removed and placed in the microwave oven for for about 75 seconds to dry. To prepare the dehydrated french fried potato product for serving, the potato pieces were soaked in tap water at a temperature of about 140°F for 10 minutes. The rehydrated product was heated in an oven at approximately 425°F for about 7 minutes.

EXAMPLE 2

The process of Example 1 was repeated, except the step of soaking in the salt solution was eliminated.

A comparison of the rehydrated and warmed products of Examples 1 and 2 showed that the crispness of the Example 1 product was slightly greater than the Example 2 product.

While this invention has been described by reference to a specific operating example, it is intended to be limited only by the scope of the appended claims.

What is claimed is:

1. A process for forming shelf stable, dehydrated, french fried type potato capable of rehydration with water comprising the steps of:
   a. obtaining potato pieces;
   b. subjecting said potato pieces to microwave heating, prior to placing them into a deep-fat frying medium, for a time period sufficient to cause partial gelatinization of the starch present in the potato pieces but insufficient to cause a water loss in excess of 3% by weight;
   c. then placing the potato pieces into a deep-fat frying medium and deep-fat frying them for a period of time sufficient to cause an additional moisture loss of at least about 50%;
   d. removing the potato pieces from the deep-fat frying medium; and
   e. heating the fried potato pieces of step (d) for a period of time sufficient to remove excess moisture, said heating resulting in dried potato pieces having an additional moisture reduction of at least about 10%.

2. The process of claim 1 wherein said potato pieces have a minimum thickness of ¼ inches.

3. The process of claim 1 wherein the moisture reduction for microwave heating is less than about 2.5%.

4. The process of claim 1 wherein the potato pieces are stored in a moisture-impermeable container.

5. The process of claim 1 wherein the potato pieces are blanched prior to said microwave heating.

6. The process of claim 1 wherein the potato pieces are soaked in a sodium chloride solution prior to microwave heating.

7. The process of claim 1 wherein the heating to remove excess moisture is microwave heating.

8. The process of claim 1 wherein the dried potato pieces are rehydrated by soaking in water.

9. A process for forming a french fried type potato comprising the steps of:
   a. obtaining potato pieces which have a minimum thickness of at least ¼ inches;
   b. subjecting said potato pieces to microwave heating, prior to placing them into a deep-fat frying medium, for a time period sufficient to cause partial gelatinization of the starch present in the potato pieces but insufficient to cause a water loss in excess of about 3% by weight;
   c. then placing the potato pieces into a deep-fat frying medium and deep-fat frying them for a period of time sufficient to cause an additional moisture loss of at least about 50%;
   d. removing the potato pieces from the deep-fat frying medium; and
   e. heating the fried potato pieces of step (d) for a period of time sufficient to remove excess moisture, said heating resulting in dried potato pieces having an additional moisture reduction of at least about 10%; and
   f. rehydrating the potato pieces by soaking in water.

10. The process of claim 9 wherein said potato pieces are blanched prior to microwave heating.

11. The process of claim 10 wherein said potato pieces are soaked in a sodium chloride solution prior to microwave heating.

* * * * *